(12) United States Patent
Kurita

(10) Patent No.: US 7,689,988 B2
(45) Date of Patent: Mar. 30, 2010

(54) INFORMATION PROCESSING APPARATUS

(75) Inventor: Tetsuo Kurita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1813 days.

(21) Appl. No.: 10/775,088

(22) Filed: Feb. 11, 2004

(65) Prior Publication Data

US 2004/0196482 A1    Oct. 7, 2004

(30) Foreign Application Priority Data

Feb. 13, 2003    (JP)    ............................. 2003-034930

(51) Int. Cl.
*G06F 9/46*    (2006.01)
*G06K 15/10*    (2006.01)

(52) U.S. Cl. ..................... 718/100; 358/1.15

(58) Field of Classification Search ................ 718/100, 718/102, 104; 358/1.12, 1.13, 1.14, 1.15, 358/1.16

See application file for complete search history.

(56) References Cited

U.S. PATENT DOCUMENTS

| | | | | |
|---|---|---|---|---|
| 5,559,933 | A * | 9/1996 | Boswell ..................... | 358/1.15 |
| 5,859,956 | A * | 1/1999 | Sugiyama et al. .......... | 358/1.13 |
| 5,978,560 | A * | 11/1999 | Tan et al. .................... | 358/1.15 |
| 6,474,881 | B1 * | 11/2002 | Wanda ........................ | 400/61 |
| 6,535,932 | B1 * | 3/2003 | Endoh et al. ................ | 710/7 |
| 7,054,021 | B2 * | 5/2006 | Sesek et al. ................ | 358/1.15 |
| 7,382,477 | B2 * | 6/2008 | Wanda ........................ | 358/1.15 |
| 2001/0053295 | A1 * | 12/2001 | Kujirai et al. ................ | 399/79 |
| 2002/0026538 | A1 * | 2/2002 | Takeo et al. .................... | 710/5 |
| 2002/0041395 | A1 * | 4/2002 | Kimura ...................... | 358/1.15 |
| 2002/0042797 | A1 * | 4/2002 | Kimura ...................... | 707/500 |
| 2002/0089689 | A1 * | 7/2002 | Ferlitsch et al. ............ | 358/1.15 |
| 2003/0090695 | A1 * | 5/2003 | Murata ...................... | 358/1.13 |

FOREIGN PATENT DOCUMENTS

| | | |
|---|---|---|
| JP | 8-63310 | 3/1996 |
| JP | 2001-84122 | 3/2001 |

* cited by examiner

*Primary Examiner*—Meng-Ai An
*Assistant Examiner*—Caroline Arcos
(74) *Attorney, Agent, or Firm*—Fitzpatrick, Cella, Harper & Scinto

(57) ABSTRACT

In a host-base printing system, it is intended to execute a continuous page printing of continuous print jobs with a maximum printing speed specific to a printing engine in a printing apparatus, without a loss in the printing speed. There is provided a host computer system in which a data generation unit generates a print job based on a drawing command entered from an application software, and transfers the generated print job for example to a printer, characterized in that a plurality of print jobs generated in succession are spooled in a system spooling unit, and a print control unit combines plural print jobs entered from the system pooling unit and transfers them as a single print job for example to a printer.

6 Claims, 12 Drawing Sheets

FIG. 12

MEMORY MEDIUM SUCH AS FD/CD-ROM

| DIRECTORY INFORMATION |
|---|
| 1ST DATA PROCESSING PROGRAM<br>PROGRAM CODES CORRESPONDING TO STEPS OF FLOW CHART IN FIG. 7 |
| 2ND DATA PROCESSING PROGRAM<br>PROGRAM CODES CORRESPONDING TO STEPS OF FLOW CHART IN FIG. 8 |
| 3RD DATA PROCESSING PROGRAM<br>PROGRAM CODES CORRESPONDING TO STEPS OF FLOW CHART IN FIG. 9 |
| 4TH DATA PROCESSING PROGRAM<br>PROGRAM CODES CORRESPONDING TO STEPS OF FLOW CHART IN FIG. 10 |
| 5TH DATA PROCESSING PROGRAM<br>PROGRAM CODES CORRESPONDING TO STEPS OF FLOW CHART IN FIG. 11 |
| |

MEMORY MAP IN MEMORY MEDIUM

ONE PRINT JOB CONTAINING N PAGES

PLURAL (N) JOBS

INFORMATION PROCESSING APPARATUS

BACKGROUND OF THE INVENTION

1. Field of the Invention

The present invention relates to a job processing in an information processing apparatus for generating a print job based on a drawing command entered from an application software and such generated print job to a printing apparatus.

2. Related Background Art

A prior printing system, for executing a printing operation by outputting image drawing data from an upper apparatus to a printing apparatus utilizing a color or monochromatic electrophotographic process, has been constructed as shown in FIG. 13.

FIG. 13 is a block diagram showing the configuration of a prior art network printing system.

Referring to FIG. 13, an upper apparatus (generally a host computer) 301, 302 or 303 is provided with a mother board, connected with a hard disk, a RAM, a display, a keyboard, a data transfer I/F, and a network board or a network adaptor 307, 308 or 309 capable of controlling a network protocol corresponding to a network 300. The host computer system 301 is provided, in addition to the network adaptor 307, with a local port, which can be connected to a local printer by means of a bi-directional I/F cable.

On the other hand, a main body 304, 305 or 306 of a printing apparatus of electrophotographic process is respectively provided with a video controller 310, 311 or 312 and an engine controller 313, 314 or 315, or a controller integrating a video controller and an engine controller.

If an application software functioning in the host computer serving as the upper apparatus is used to execute printing, for example, a document of 11 pages by designating plural copies (N copies) from the application software or from a user interface for print setting of the printing system, a print job including drawing information of a page and a copy number N as one of print information associated therewith are entered from the application software to the printing system, which in response generates a print job containing N pages and transfers such job to the connected printing apparatus as shown in FIG. 14A.

Also a certain application software in advance generates a print job including N pages for entry into the printing system, which transfers it in the form of a print job including N pages as shown in FIG. 14A.

FIGS. 14A and 14B are a conceptual view showing an example of job transfer process in a prior network printing system as shown in FIG. 13.

In the aforementioned case shown in FIG. 14A, the printing can be executed with a maximum speed specific to a printing engine in the connected printing apparatus, unless the drawing information of a page is extremely large, namely unless a long time is required for generating the drawing information.

However, in a certain specified application software functioning on the upper apparatus, if a document of 1 page is printed by designating plural copies (N copies) from the application software or from a user interface for print setting of the printing system, the application software may generate N print jobs each containing drawing information of 1 page for entry into the printing system, as shown in FIG. 14B.

In such case, also the printing system transfers N print jobs in succession to the connected printing apparatus.

Also in the printing apparatus utilizing the electrophotographic process, receiving the plural print jobs from the upper apparatus, there may be generally executed a control of resetting the printing engine at a partition between-the jobs, for executing a toner fixing control (e.g., temperature increase/decrease control of a fixing device).

Therefore, in a continuous printing of plural pages (N pages), it has not been possible to execute the printing at a maximum speed specific to the printing engine.

SUMMARY OF THE INVENTION

The present invention is to resolve the aforementioned drawback, and an object of the present invention is to provide an information processing apparatus capable of continuous page printing of continuous print jobs with a maximum printing speed specific to a printing engine in a printing apparatus, without a loss in the printing speed, by spooling plural print jobs generated in succession, combining plural print jobs entered from a spooling unit and transferring them as a single print job to the printing apparatus, without requiring any change in the control at the side of the printing apparatus in a host-based printing system, since, even in case plural print jobs are continuously entered from an application software to the printing apparatus, a predetermined reset process is not activated at each partition between the print jobs.

In order to attain the above-mentioned object, the data processing apparatus of the present invention has a following configuration.

The present invention provides an information processing apparatus for generating a print job based on a drawing command entered from an application software and transferring the generated print job to a printing apparatus, characterized in including spooling means capable of spooling a plurality of print jobs generated in succession (for example corresponding to a system spool unit 522 shown in FIG. 3), and control means capable of combining the plural print jobs entered from the spooling means and transferring them as a single print job to the printing apparatus (for example corresponding to a print control unit 523 shown in FIG. 3).

Other features and advantages of the present invention will be apparent from the following description taken on conjunction with the accompanying drawings, in which like reference characters designate the same or similar parts throughout the figures thereof.

BRIEF DESCRIPTION OF THE DRAWINGS

FIG. 12 is a view showing a memory map of a memory medium for storing various data processing programs readable with the information processing apparatus of the present invention;

DESCRIPTION OF THE PREFERRED EMBODIMENTS

First Embodiment

Figure 1:
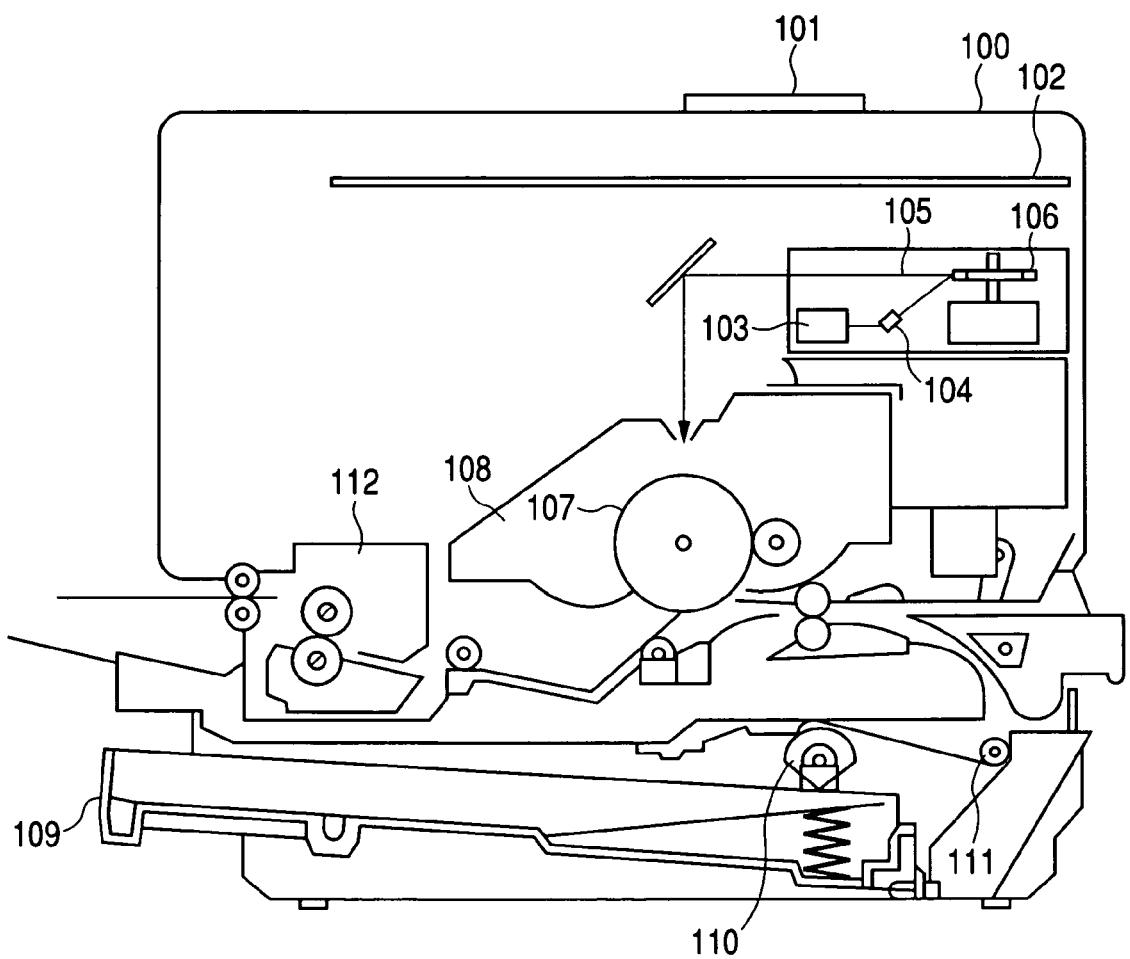
FIG. 1 is a schematic cross-sectional view of an example of a printing apparatus in which the present invention is applicable.

FIG. 1 is a schematic cross-sectional view showing an example of a printing apparatus in which the present invention is applicable, corresponding for example to a laser beam printer of electrophotographic process. This embodiment shows an example of a monochromatic printing apparatus, but the present invention can be realized in monochromatic or color. In the following, configuration and function of the embodiment will be explained.

Referring to FIG. 1, a main body 100 of the laser beam printer is connected to an external apparatus, such as a host computer system, constituting an upper apparatus, and executes a printing based on a print job transferred from such host computer and including a control code and drawing data such as a character code, graphic data or bit map data.

An operation panel 101 is provided with operation switches (keys), an LED display device and an LCD display device and is used for setting an environment of the printing apparatus, but is not indispensable in the main body 100 since such environment setting is recently executed often in the external apparatus such as the host computer system.

A video controller 102 controls the entire laser beam printer 100, analyses a print job including drawing data transferred from the host computer constituting the upper apparatus, and develops the drawing data into bit map data in a memory. It also instructs a temperature elevating process to an unrepresented print engine controller as a preparation for a printing operation, based on a job start command contained in the print job, or instructs a resetting process of the print engine in response to a detection of a job start command or a job end command contained in the print job. The page bit map data developed in the memory are outputted to the print engine controller.

The print engine controller converts the entered page bit map data into a video signal and outputs it to a laser driver 103. The laser driver 103 is a circuit for driving a semiconductor laser 104 and executes on/off switching of a laser light 105 emitted from the semiconductor laser 104 according to the entered video signal.

The laser light 105 is deflected in a lateral direction by a rotary polygon mirror 106 to scan a surface of an electrostatic drum 107. Thus, an electrostatic latent image corresponding to a drawn pattern is formed on the electrostatic drum 107. This latent image is developed by a developing unit 108 positioned around the electrostatic drum 107, and is transferred onto a recording sheet through a fixing device 112. In the course of a continuous printing of plural pages, in case, after the completion of printing of drawing data of a page, drawing data of a next page are not inputted within a predetermined time (time enabling a continuous printing, hereinafter called a safety time), the print engine controller starts a resetting of the print engine or automatically enters a temperature decreasing process for protecting the fixing device 112 and starts a temperature elevating process when the data for a next page are inputted, regardless of the instruction from the video controller 102.

A cut sheet is used as the recording paper for the image transfer through the fixing device 112. Such cut-sheet recording paper is contained in a sheet cassette 109 mounted in the main body 100 of the laser beam printer, fed into the apparatus by a feed roller 110 and conveying rollers 111, and is supplied to the electrostatic drum 107.

Figure 2:
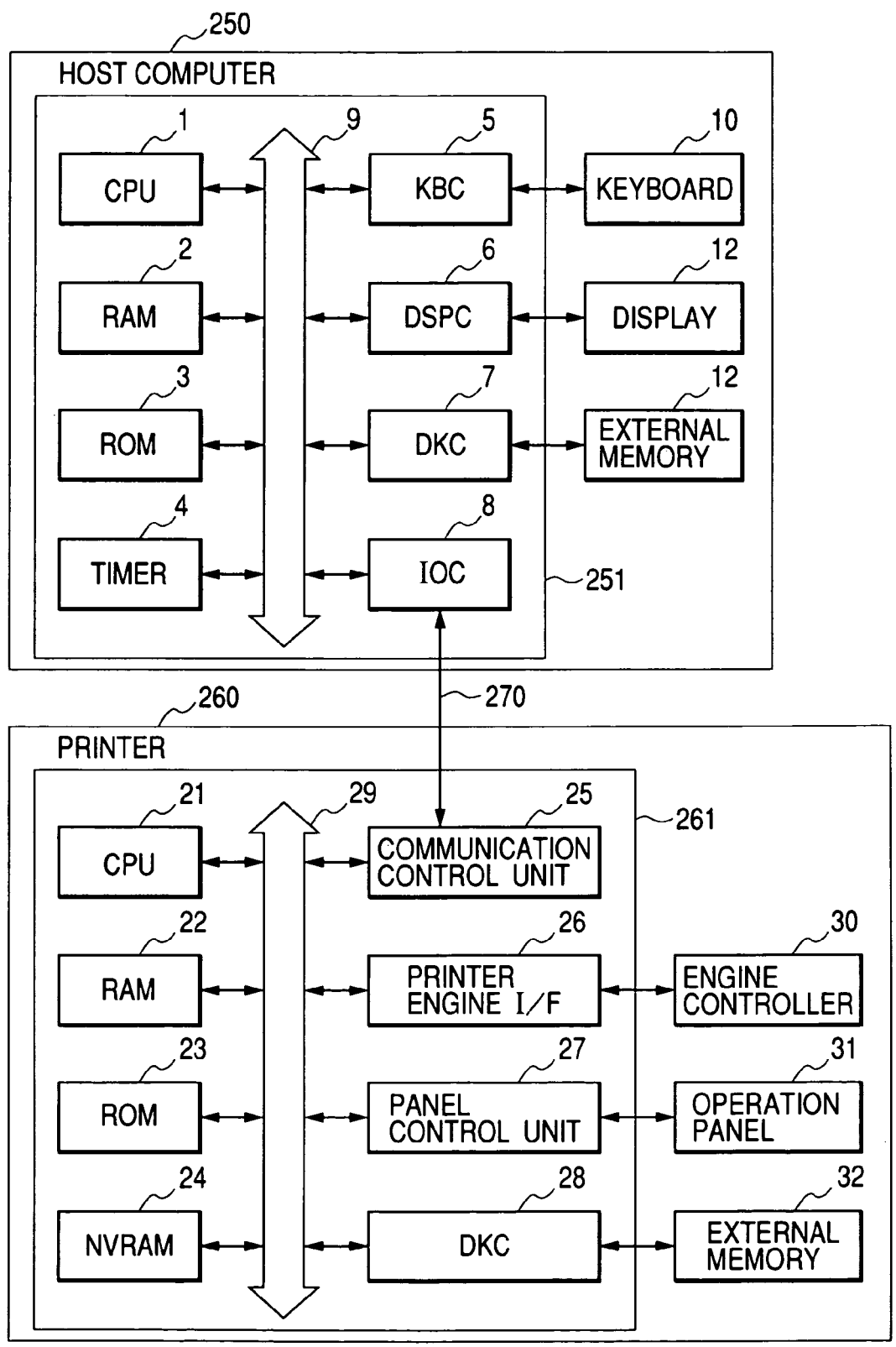
FIG. 2 is a block diagram showing a schematic configuration of an image output system in which a data processing apparatus and a printer of the present invention are applicable.

FIG. 2 is a block diagram showing a schematic configuration of an image output system in which a data processing apparatus and a printer of the present invention are applicable. This image output system (printing system) corresponds to a configuration in which a host computer 250 constituting an upper apparatus and a printing apparatus (printer) 260 utilizing an electrophotographic process are connected through a bi-directional interface 270.

Referring to FIG. 2, the host computer 250 is provided with a control unit 251 for controlling a main body of the host computer. The control unit 251 is constituted of a CPU 1, a RAM 2, a ROM 3, a timer 4, a keyboard controller (KBC) 5, a display controller (DSPC) 6, a disk controller (DKC) 7 and an I/O controller (IOC) 8.

The CPU 1 executes a boot program or an application stored in the ROM 3 or in an external memory 12, and comprehensively controls the aforementioned devices connected to a system bus 9.

The RAM 2 functions as a main memory and a work area of the CPU 1. The keyboard controller 5 controls key inputs from a keyboard 10 and from an unrepresented pointing device. The display controller 6 controls a display on a CRT display, a liquid crystal display 11 etc. The disk controller 7 controls access to the external memory 12 such as a hard disk (HDD), a flexible disk (FDD), a flash PROM etc., capable of storing a boot program, various application programs, font data, user files etc.

The I/O controller 8 is connected to a printer 260 through a predetermined bi-directional interface 270 (hereinafter simply called interface) to execute a communication control with the printer 260.

The I/O controller 8 may be connected with the printer 260 through a device incorporated in advance in a control unit 251, or may be connected with the printer 260 through a device optionally attached to a bus slot (such as an ECP board, a USB2.0 board, an IEEE1394 board, a network board or a network adaptor), and executes the communication control according to each connection status.

On the other hand, the printing apparatus (printer) 260 is provided with a printer control unit 261. The printer control unit 261 has functions of controlling the entire main body of the printing apparatus, or, in case an unrepresented two-side unit is mounted, controlling the entire printer including such two-side unit, and also of analyzing image information supplied from the host computer 250, and is constituted of a CPU 21, a RAM 22, a ROM 23, a NVRAM 24, a communication control unit 25, a printer I/F 26, a panel control unit 27 and a disk controller (DKC) 28.

The CPU 21 comprehensively controls access to the aforementioned devices connected to a system bus 29 based for example on a control program stored in the ROM 23 or an external memory 32, and outputs an engine controller controlling command and an image signal, as output information, to an engine controller 30 connected through the printer I/F 26.

The ROM 23 stores a program which serves, through a panel control unit 27 having a device driver for controlling a switch, an LED display unit, an LCD message display device etc. provided on an operation panel 31, to control turn-on/off or flashing of the LED, and a display or a change of a message character train on the LCD.

Also the CPU 21 is rendered capable of communication with the host computer 250 through a communication control unit 25, whereby information in the printing apparatus 260 can be informed to the host computer 250. The RAM 22 functions as a main memory and a work area of the CPU 21, and is rendered expandable in the memory capacity by an optional RAM to be connected to an expansion port (not shown). The NVRAM 24 is used for storing environment data etc. of the printer.

The printer of the present invention may also be so constructed as to achieve a cost reduction, as in a recent host-base printer (in which analysis of characters, drawing code etc. and control process are mostly executed in a host computer), by dispensing with the external memory 32 or the operation panel 31, or by employing a combination of a CPU 21 of a medium functionality level and an ASIC.

Furthermore, the communication control unit 25 is not limited to a Centronics I/F but the present invention can naturally employ USB, IEEE1394 or other configurations capable of controlling various network protocols.

Figure 3:
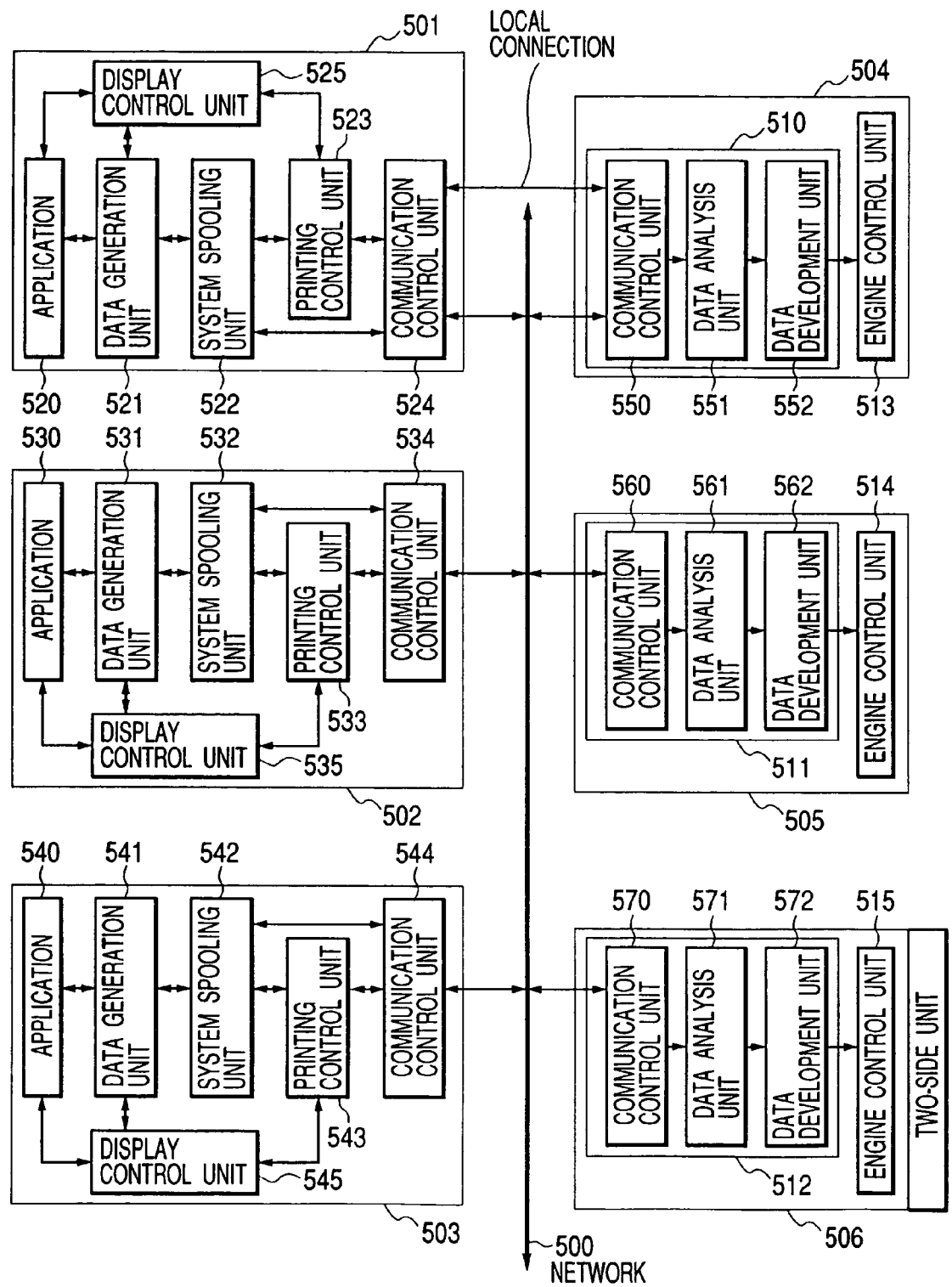
FIG. 3 is a block diagram showing a configuration of an image output system of the present invention.
Figure 4:
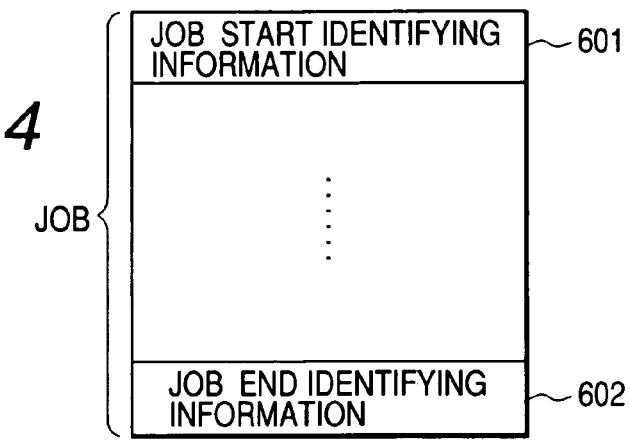
FIG. 4 is a view showing a job configuration in the image output system of the present invention.

FIG. 3 is a block diagram showing the configuration of the image output system of the present invention, corresponding to a case where host computer system (host computers) 501—503 serving as an upper apparatus is rendered communicable with printers 504—506 through a network 500, and a printer 504 can be locally connected to a host computer system 501 through a predetermined interface.

If a printing process is executed in the present embodiment, following processes are executed by a program of the printing system, installed and stored from a memory medium such as a CD-ROM to a memory area (RAM 2 or external memory 12 shown in FIG. 2) of the host computer systems 501, 502 or the host computer system 503 constituting the upper apparatus.

Referring to FIG. 3, in case the user executes a printing in the host computer systems 501—503 by application software 520, 530 or 540, the user at first gives an instruction for printing from the application software 520, 530 or 540 or from an unrepresented user interface provided in the printing system.

Then, in response to such printing instruction, the application software 520, 530, 540 and an unrepresented drawing process unit, which functions in cooperation therewith, generate a print job containing drawing data based on print control information (device mode information corresponding to a document to be printed, to be commonly used by the application software and the printer driver at the printing operation, and including all information relating to the printing such as information on sheet size, printing direction, resolution etc.) and enter such print job to data generation unit (also called printer device driver) 521, 531 or 541 of the printing system software.

The data generation unit 521, 531, 541, having received the print job, converts it into a print job interpretable by the connected printing apparatus, and enters such print job (wherein a print job contains data of 1 or plural pages, and in each print job, a job start identifying information 601 and a job end identifying information 602 are usually attached respectively at the start and at the end of drawing information of 1 or plural pages) in the order of pages to a system spooling unit 522, 532 or 542 incorporated in an operating system (OS) provided in the host computer system constituting the upper apparatus.

In case of executing the spooling process under a network environment (in the environment of connection by the network 500), the system spooling units 522, 532 or 542 may be the system spooling units 522, 532, 542 of the host computer system same as that of the data generation units 521, 531, 541 in the printing system, or may cooperate with the system spooling unit in another host computer system serving as a print server whereby the system spooling units of both host computer system may be utilized.

In the host computer system 501, 502, 503, data output is made through the system spooling unit 522, 532, 542 to a destination to which a network connection is established in advance for example by a name of the printing apparatus connected to the network 500, a network address, a name of the host computer serving as the print server or a port name.

A print control unit 523, 533 or 534 in the printing system of the present invention, installed in the upper apparatus, upon acquiring the print job (also called spool data) spooled by the system spooling unit 522, 532, 542, executes a control of the print job, a management of the printing apparatus connected to the network, or a connection of continuously entered print jobs, based on the print control information contained in the print job constituting the spool data or in the aforementioned device mode information.

In the present invention, a connection of print jobs means not to transmit, to the printing apparatus 504, 505 or 506, information requesting an initialization (resetting process) to a print engine controller (engine controller unit) 513, 514 or 515 at the transmission to the printing apparatus 504, 505 or 506 such as a job start identifying information or a job end identifying information contained in the print job.

Also in the present invention, information requesting the initialization (reset process) in the engine controller unit 513, 514 or 515 is not limited to the job start identifying information and the job end identifying information mentioned above, but can be any information transmitted from the upper apparatus and triggering an initialization.

Also the aforementioned print control unit 523, 533, 543 also has a function as a print server for managing the user name or the computer name of the spooled print job, and, after various controls for the print job, can also transfer the print job to a printing apparatus of a transfer destination through the communication control unit 524, 534 or 544, or can also control and manage a plurality of plural data from different host computers.

A display control unit 525, 535 or 545 also has means of displaying the print job information as information to the user on a display (display 11 shown in FIG. 2) through an unrepresented print status window.

Data transfer from the print control unit 523, 533, 543 to the printing apparatus 504, 505, 506 is executed through the communication control unit 524, 534, or 544 having for example a port control program.

The printing apparatus 504, 505 or 506 temporarily stores the print job, received from the host computer system constituting the upper apparatus through the communication control unit 550, 560 or 570 on a video controller 510, 511 or 512 (corresponding to the printer control unit 261 shown in FIG. 2 or the printer control unit 102 shown in FIG. 1), in the RAM 22 or the external memory 32 shown in FIG. 2, and, upon detecting a job start information or a job end information contained in the received print job or a resetting information for the print engine controller by means of a print control program stored in the ROM 23, RAM 22 or external memory 32 shown in FIG. 2 or by means of an ASIC, executes an initialization of the engine control unit 513, 514 or 515 (corresponding to the engine controller 30 shown in FIG. 2) for controlling electrophotography-related processes such as charging, exposure, development, transfer, fixation, paper conveying etc. or a temperature increase/decrease process for the fixing device, and also executes a development of the page bit map data contained in the print job as video data in the engine controller by data analysis unit 551, 561, 571 and a data development unit 552, 562, 572.

Thus developed video data are transferred to the print engine controller and are printed on an actual recording medium under the controls of charging, exposure, development, transfer, fixation, paper conveying etc.

The print control program stored in the ROM 23, RAM 22 or external memory 32 shown in FIG. 2 has a function of informing the host computer, through the communication control unit, of a status information of the printing apparatus such as presence/absence of a two-side unit in the printing apparatus, a jam information, presence/absence of completion of the printing and a door open state.

Figure 5:
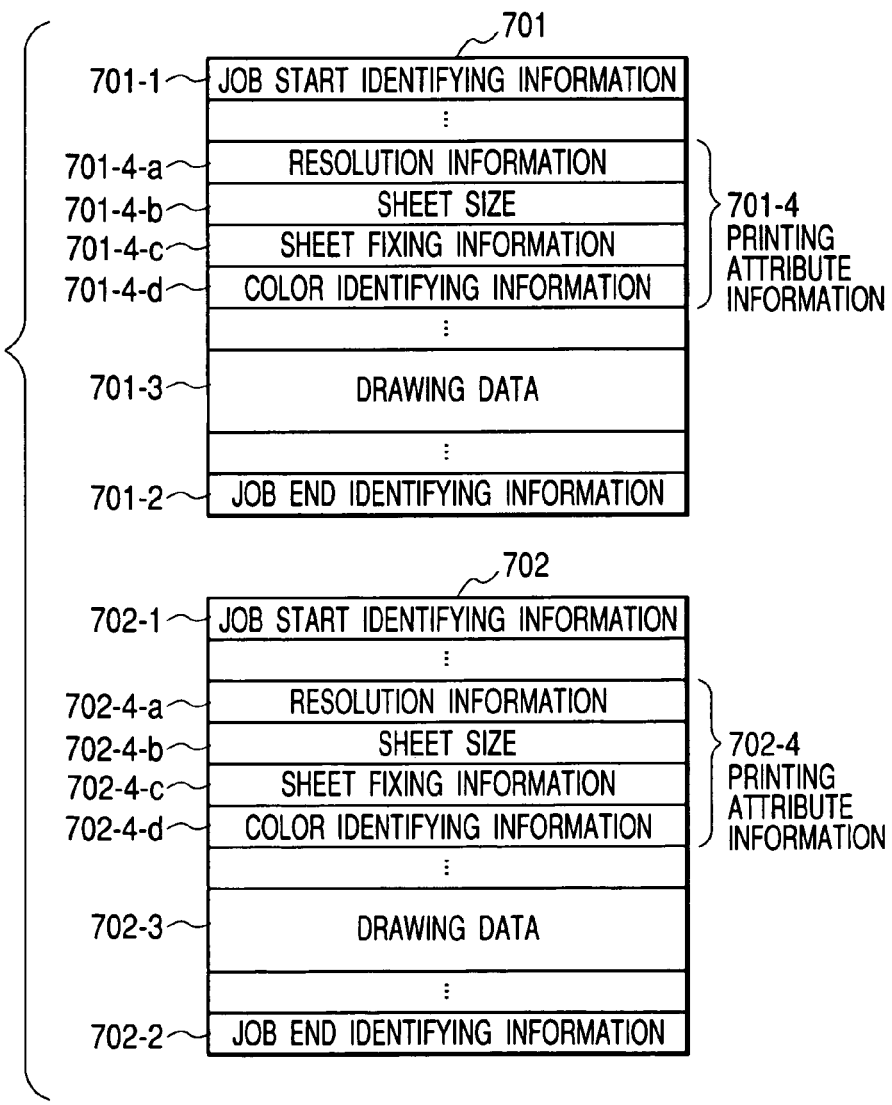
FIG. 5 is a view showing a data configuration of a print job generated by a data generation unit in the image output system shown in FIG. 3.

FIG. 5 shows a data structure of a print job generated by the data generation unit 521, 531, 541 in the image output system shown in FIG. 3. In the following there will be explained, with reference to FIG. 5, an example in which the host computer 501 cause the printing apparatus 504 to print plural jobs, in the present embodiment of the above-explained configuration.

Now, let us consider a case where the application software 520 installed in the host computer 501 instructs a printing, utilizing a user interface dialog for executing the printing provided in the application (such dialog not being illustrated and having a form and set items dependent on each application), whereby the drawing data are outputted in succession to the data generation unit 521 of the printing system of the present invention thereby generating plural job data shown in FIG. 5.

In FIG. 5, 701 indicates first job data, and 702 indicates next generated job data. These job data are constituted respectively of job start identifying information 701-1, 702-1 indicating a start of the job, job end identifying information 701-2, 702-2 indicating an end of the job, drawing data 701-3, 702-3 of 1 or plural pages, and print attribute information 701-4, 702-4 for the drawing data, attached to each page.

The print attribute information 701-4, 702-4 contains various information necessary for the print control, and there is shown, as an example, a case of including resolution information 701-4-a, 702-4-a indicating a print resolution such as 600 dpi/300 dpi, sheet size information 701-4-b, 702-4-b defining a sheet size such as A3/A4/letter, sheet fixation information 701-4-c, 702-4-c, for defining a toner fixing mode optimum for the type of paper such as board, thin paper or plain paper, color information 701-4-d, 702-4-d indicating color/monochromatic etc.

Various attribute information contained in the print attribute information, though variable depending on the printing apparatus, are generated usually based on an application software, an unrepresented drawing process unit cooperating with the application software, and a device mode information, generally called DEVMODE information in the Windows (registered trade mark) operating system of Microsoft, which can be commonly used in the data generating unit (printer driver) of the printing system, installed in the upper apparatus of the present invention and in the print control unit.

The aforementioned job data 701, 702 are outputted in succession to the system spooling unit 522 (spooling).

Figure 6:
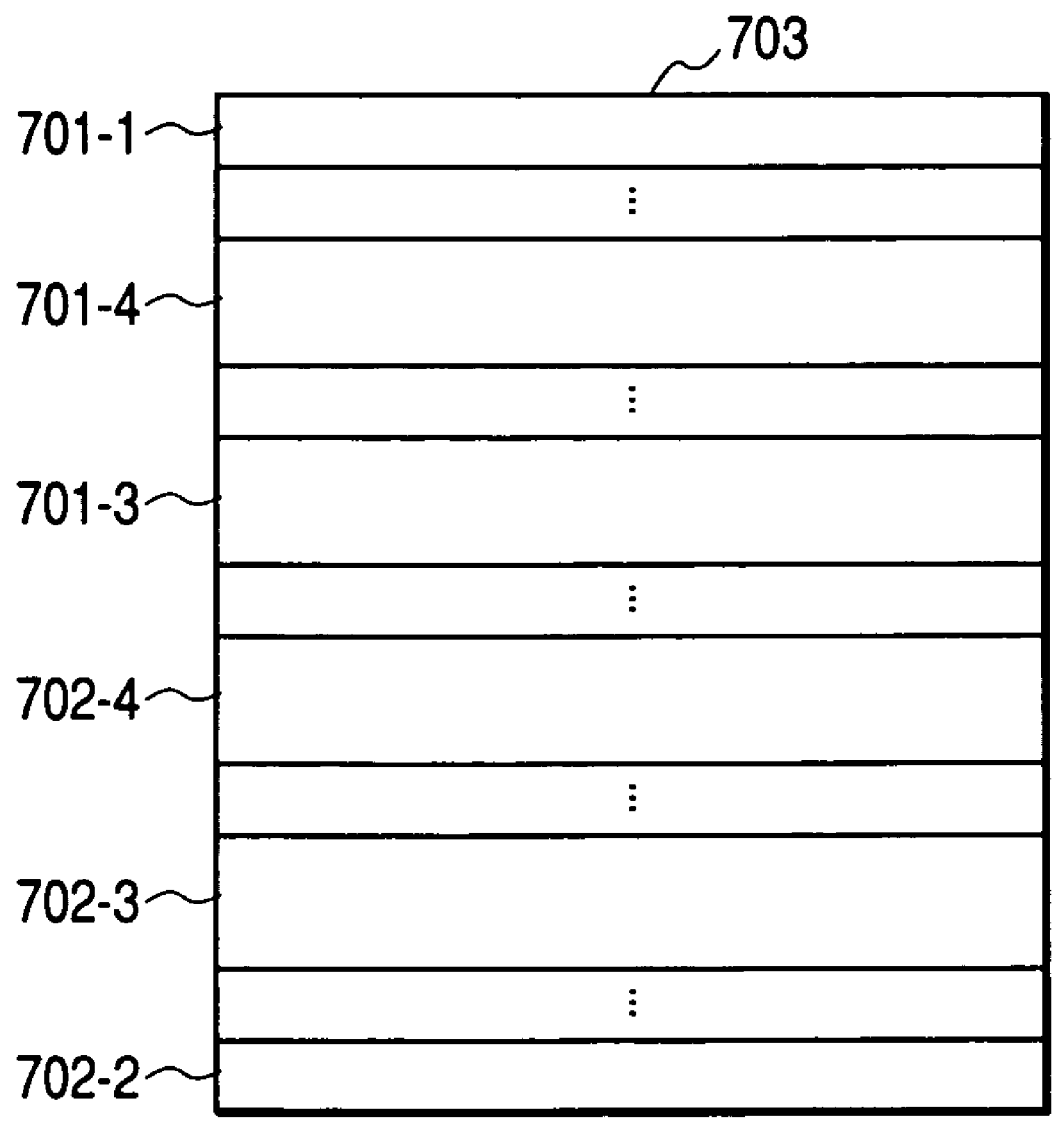
FIG. 6 is a conceptual view showing a job processing state in a print control unit of the image output system shown in FIG. 3.

FIG. 6 is a conceptual view showing a job process state by the print control units 523, 533, 543 in the image output system shown in FIG. 3.

As shown in FIG. 6, the print control unit 523 receives the job data in succession from the system spooling unit 522, and, upon acquiring the aforementioned first job data 701 (to be currently printed), transfers the job start identifying information 701-1, the print attribute information 701-4 of the drawing data, and the drawing data 701-3 in succession to the printing apparatus 504 constituting the output destination through the communication control unit 524. However, upon detecting the job end identifying information 701-2, it does not transfer such job end identifying information but discriminates whether there exists succeeding job data 702 to be printed next (for example by judging whether the job identifying information 702-1 is detected). In case the succeeding print job is present, it does not transfer the job end identifying information 701-2 of the current job and the job start identifying information 702-1 of the succeeding print job to the printing apparatus but transfers in succession the print attribute information 702-4 of the drawing data of the succeeding job and the drawing data 702-3.

The job end identifying information 702-2 is processed, in the same manner as when the job end identifying information 701-2 of the job 701 is detected, regarding the succeeding print job as the current print job. In case a succeeding print job to be printed next cannot be detected, the job end information 702-2 is transferred to the printing apparatus of the output destination through the communication control unit 524.

In the printing apparatus 504 of the present invention, through the above-described process, the two jobs 701, 702 present in the host computer are handled as a single job 703 as shown in FIG. 6, so that there is not executed a process usually inserted between the jobs, namely an initialization (resetting) process of the engine controller including a temperature decreasing process for the fixing device of the engine at the completion of printing of a preceding job and a temperature increasing process for the fixing device of the engine at the start of printing of a succeeding job, whereby a printing of continuous pages can be executed with a maximum engine speed specific to the printing engine, without interposing a waiting time between the pages.

In the following, a control flow in the print control unit 523 will be explained with reference to a flow chart shown in FIG. 7.

Figure 7:
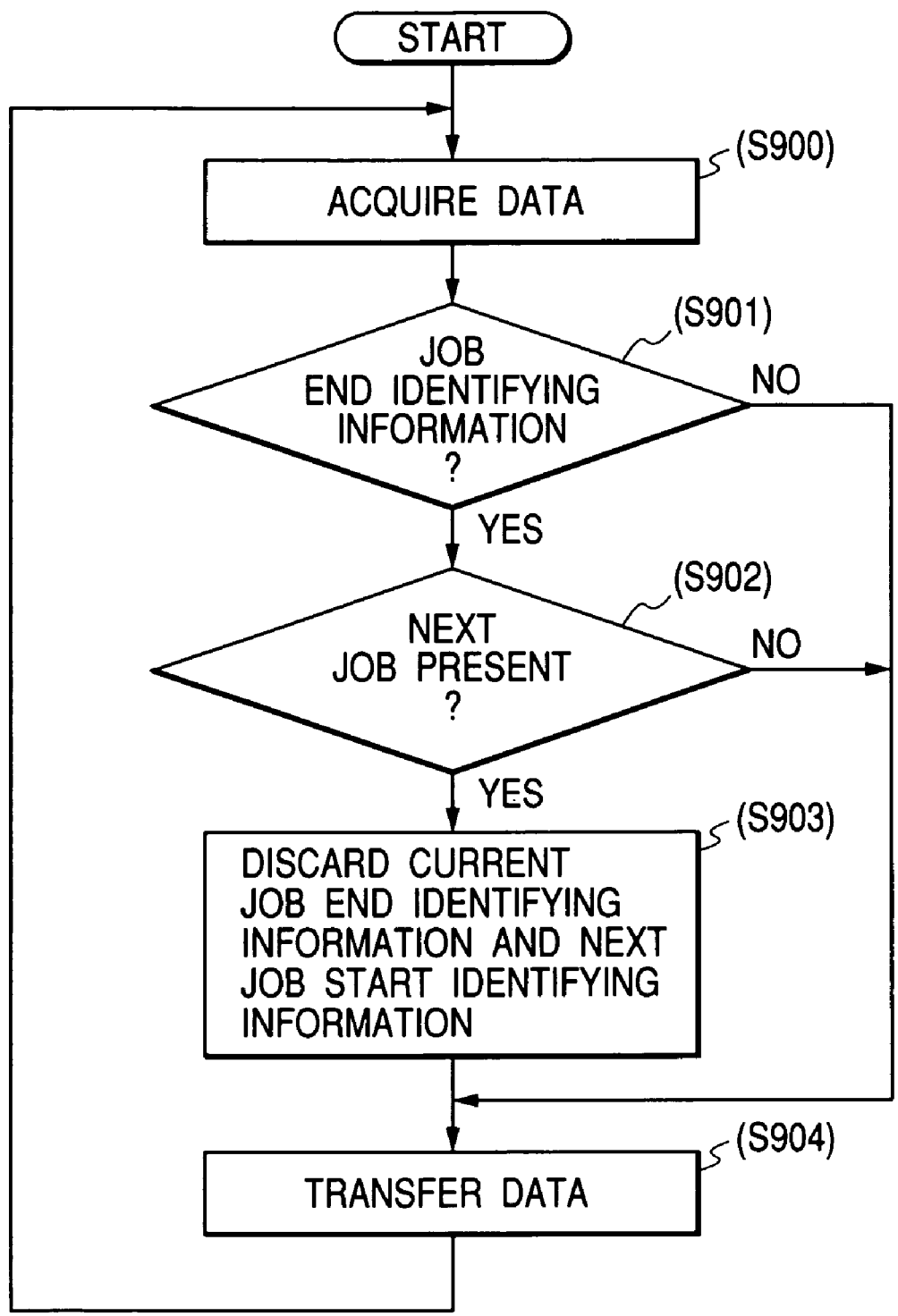
FIG. 7 is a flow chart showing an example of a first data processing procedure in the information processing apparatus of the present invention.

FIG. 7 is a flow chart showing an example of a first data processing procedure in the information processing apparatus of the present invention, corresponding to a job processing procedure in the print control unit 523, 533, 543. S900 to S904 indicate process steps.

According to a program of the print control unit 523 in the printing system shown in FIG. 3, job data, including the print information spooled by the system spooling unit 522, are acquired in succession (S900), and, until a job end identifying information contained in the first acquired current print job is detected in a step S901, other print information is transferred in succession to the connected output apparatus (printers 504—506 shown in FIG. 3) (S904).

When the step S901 detects the job end identifying information, a step S902 discriminates whether a succeeding print job to be printed next is present, and, if absent, the flow proceeds to a step S904 to transfer the current job end identifying information to the printing apparatus of the output desitnation, but, if the succeeding print job is judged present, the current job end identifying information and the job start identifying information of the succeeding print job are discarded (S903) and a step S904 then transfer other print information to the printing apparatus.

In the step S900, print data are acquired in succession from the system spooling unit 522, and, when the processing of the current print job is completed, the step S901 continues the processing by handling the succeeding print job as the current print job, as long as such print job exists.

It is thus rendered possible, even in case jobs are transmitted by spooling in continuous manner, to execute the printing operation maintaining a maximum print speed specific to the print engine controller.

Second Embodiment

In the first embodiment, within the print job, the job start identifying information and the job end identifying information are considered as information triggering a resetting process of the print engine controller and are not transmitted to the output apparatus of the destination but are discarded in the step S903 in FIG. 7. However the present invention is not particularly limited to the job start identifying information and the job end identifying information, and, in case the information in the print job triggering the resetting process of the print engine controller is a job end identifying information, such job end identifying information may be discarded in the step S903, and, in case the print job includes an explicit reset instructing information for the print engine controller as attribute information, such reset instructing information may be discarded in the step S903. Such embodiment will be explained in the following.

Figure 8:
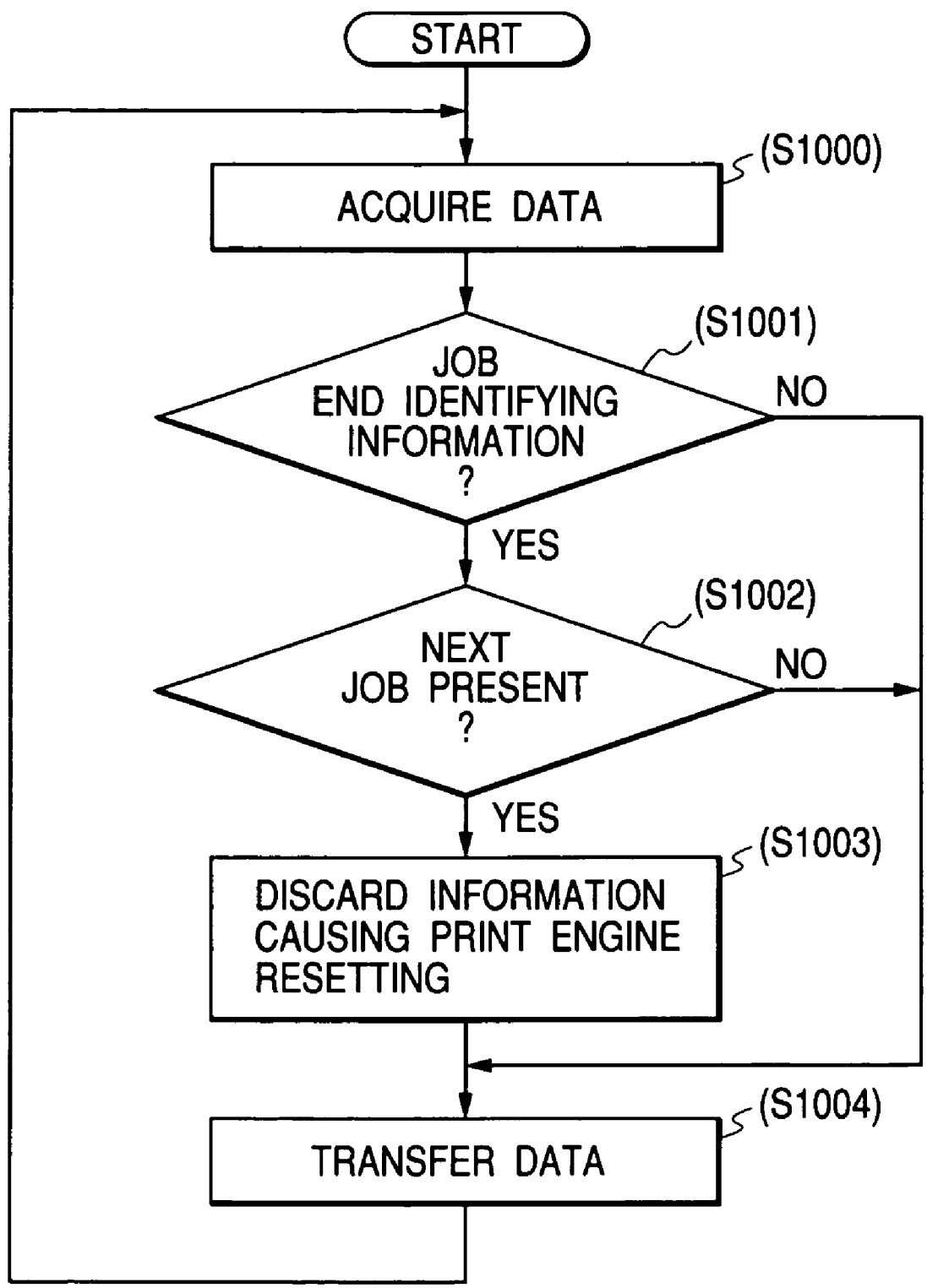
FIG. 8 is a flow chart showing an example of a second data processing procedure in the information processing apparatus of the present invention.

FIG. 8 is a flow chart showing an example of a second data processing procedure in the information processing apparatus of the present invention, corresponding to a job processing procedure in the print control unit 523, 533, 543. S1000 to S1004 indicate process steps.

In the present embodiment, a step S1003 discards a reset instructing information in a succeeding job instead of the step S903 shown in FIG. 7. Other steps are same as those explained in the foregoing and will not, therefore, be explained further.

Third Embodiment

In the foregoing first and second embodiments, there has been explained a case where a current job and a succeeding job are unconditionally connected as a continuous job after the step S902 in FIG. 7 or after the step S1002 in FIG. 8, but there may also be adopted a configuration which discriminates, after the step S902 in FIG. 7 or after the step S1002 in FIG. 8, whether a current job and a succeeding job can be connected as a continuous job, and controls the transfer of jobs based on the result of such discrimination. In the following there will be explained such embodiment.

Figure 9:
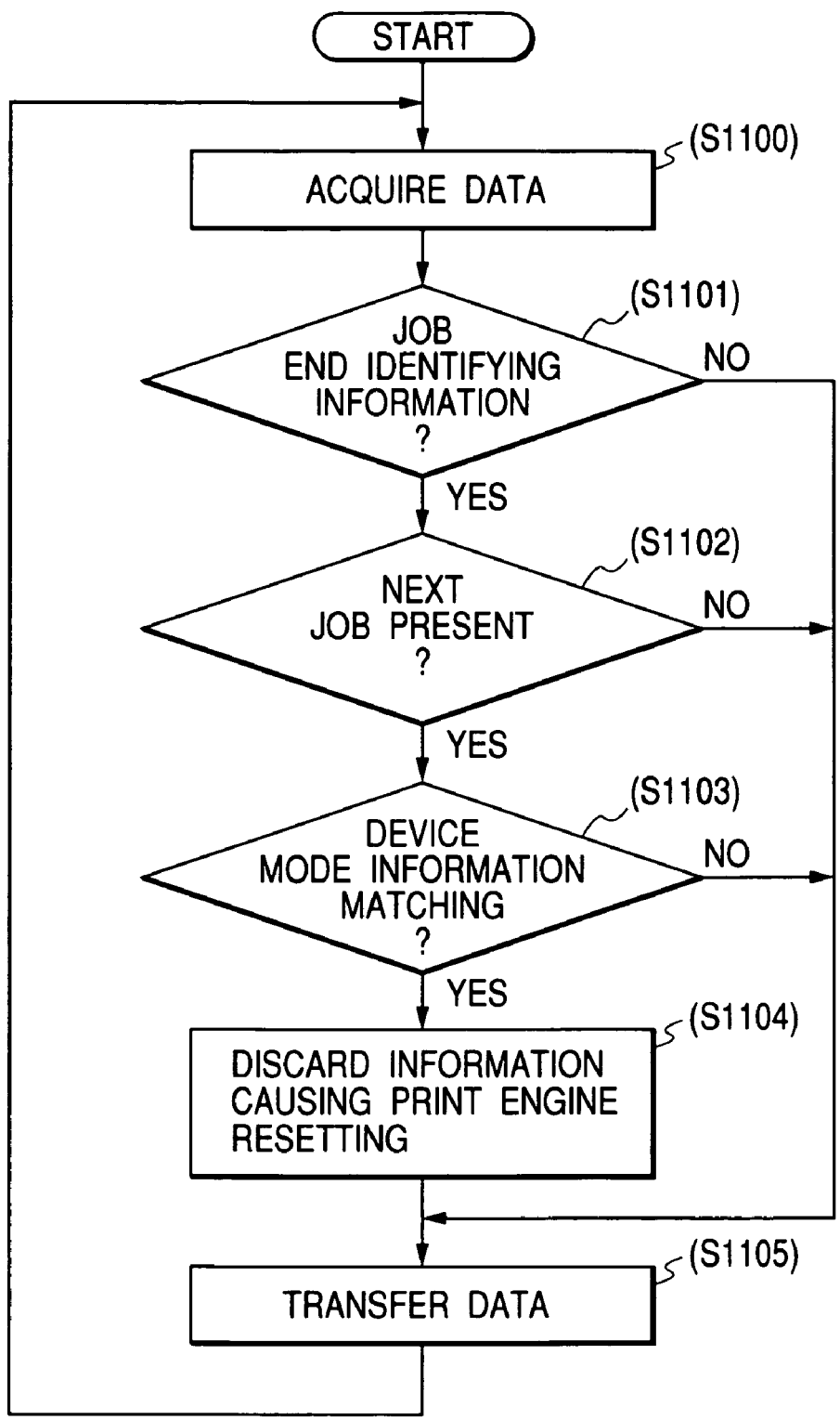
FIG. 9 is a flow chart showing an example of a third data processing procedure in the information processing apparatus of the present invention.

FIG. 9 is a flow chart showing an example of a third data processing procedure in the information processing apparatus of the present invention, corresponding to a job processing procedure in the print control unit 523, 533, 543. S1100 to S1105 indicate process steps.

In the third embodiment, after the step S902 in FIG. 7 or the step S1002 in FIG. 8 in the first or second embodiment, in order to judge whether the current job and the succeeding job can be actually connected as a continuous job, namely in order to ensure that a resetting process for the print engine controller is not required in the output apparatus between the print processes of the jobs, a step S1103 compares the device mode information respectively corresponding to the current job and the succeeding job.

This step for comparing the device mode information is executed between the steps S902 and S903 in FIG. 7 or between the steps S1002 and S1003 in FIG. 8, and other processes are same as explained in the foregoing. Therefore, explanation will not be given to such other processes and will be given only on the step S1103.

The step S1103 in FIG. 9, after a preceding step discriminates whether a succeeding print job is present and in case such succeeding print job is present, acquires device mode information corresponding to the current print job and device mode information corresponding to the succeeding print job and discriminates whether such device mode information mutually coincide. In case of coincidence, a next step discards information triggering a resetting of the print engine controller in order to combine the jobs (S1104), but, in case of non-coincidence, the jobs are transmitted without such discarding to the output apparatus (S1105).

If the print attribute information group (701-4, 702-4 shown in FIG. 5) in the print job includes all the print information requiring the initialization of the print engine controller, the step S1103 made be so executed as to discriminate coincidence on all the print attribute information group in the current and succeeding print jobs or only on the print information requiring the initialization of the print engine controller.

Fourth Embodiment

In the foregoing embodiment, in case print jobs each containing print information of 1 page only (with 1 copy each) are present in succession, the resetting process for the print engine controller is executed after every printing of one page, whereby the printing speed in the continuous printing operation may be significantly lowered. Therefore, there may be adopted a configuration enabling the printing with the maximum speed specific to the print controller only in such situation. Such embodiment will be explained in the following.

Figure 10:
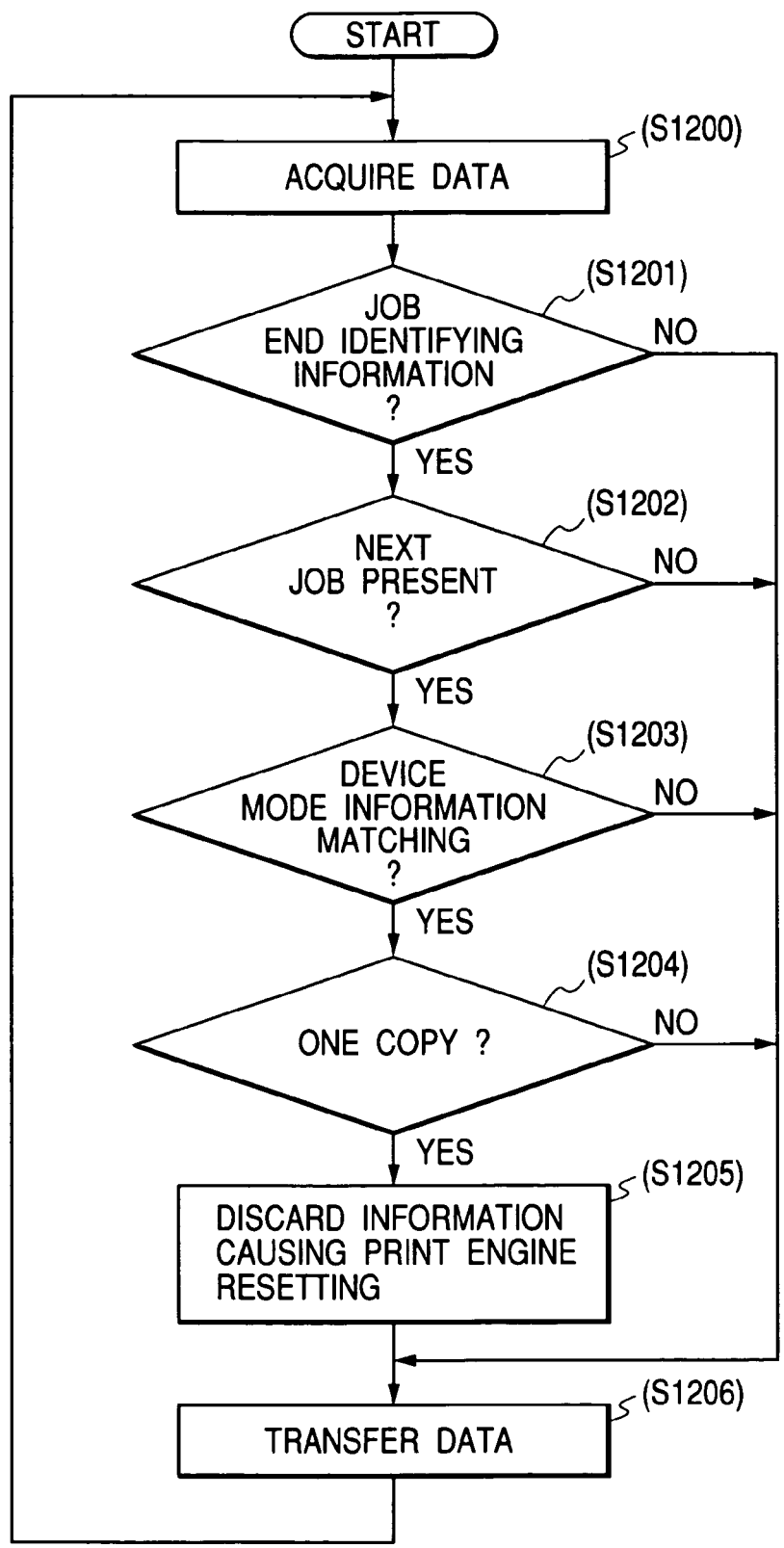
FIG. 10 is a flow chart showing an example of a fourth data processing procedure in the information processing apparatus of the present invention.

FIG. 10 is a flow chart showing an example of a fourth data processing procedure in the information processing apparatus of the present invention, corresponding to a job processing procedure in the print control unit 523, 533, 543. S1200 to S1206 indicate process steps. In this flow, a process for discriminating whether the page is printed by 1 copy is inserted between the steps S1103 and S1104 shown in FIG. 9, and other processes are same as explained in the foregoing. Therefore, explanation will not be given to such other processes and will be given only on the step S1204.

The step S1204, after a preceding step discriminates whether the device mode information mutually coincide and in case of coincidence, discriminates whether a copy number information is 1 in the device mode information corresponding to the current print job or in the device mode information corresponding to the succeeding print job, and in case of 1 copy, a next step discards information triggering a resetting of the print engine controller in order to combine the jobs (S1205), but, in case of non-1 copy, the jobs are transmitted without such discarding to the output apparatus (S1206).

A discrimination whether the copy number is 1 copy can also be achieved by judging a copy number information if such copy number information is included in the print attribute information group (701-4, 702-4 in FIG. 5) in the print job.

The flow in such case can be obtained by merely replacing the copy number information, checked in the step S1204, by the print attribution information in the print job, and such flow will not be explained further.

Fifth Embodiment

In the foregoing embodiment, there has been explained a case of processing a print job in which the print information is constituted of plural pages, but certain print jobs contain the print information of only one page. Therefore, there may be adopted a configuration of combining the print jobs and transferring the combined job only for an application software which inputs the print jobs, containing the print information of 1 page only (with 1 copy), in succession to the data generation unit (printer driver) of the printing system. Such embodiment will be explained in the following.

Figure 11:
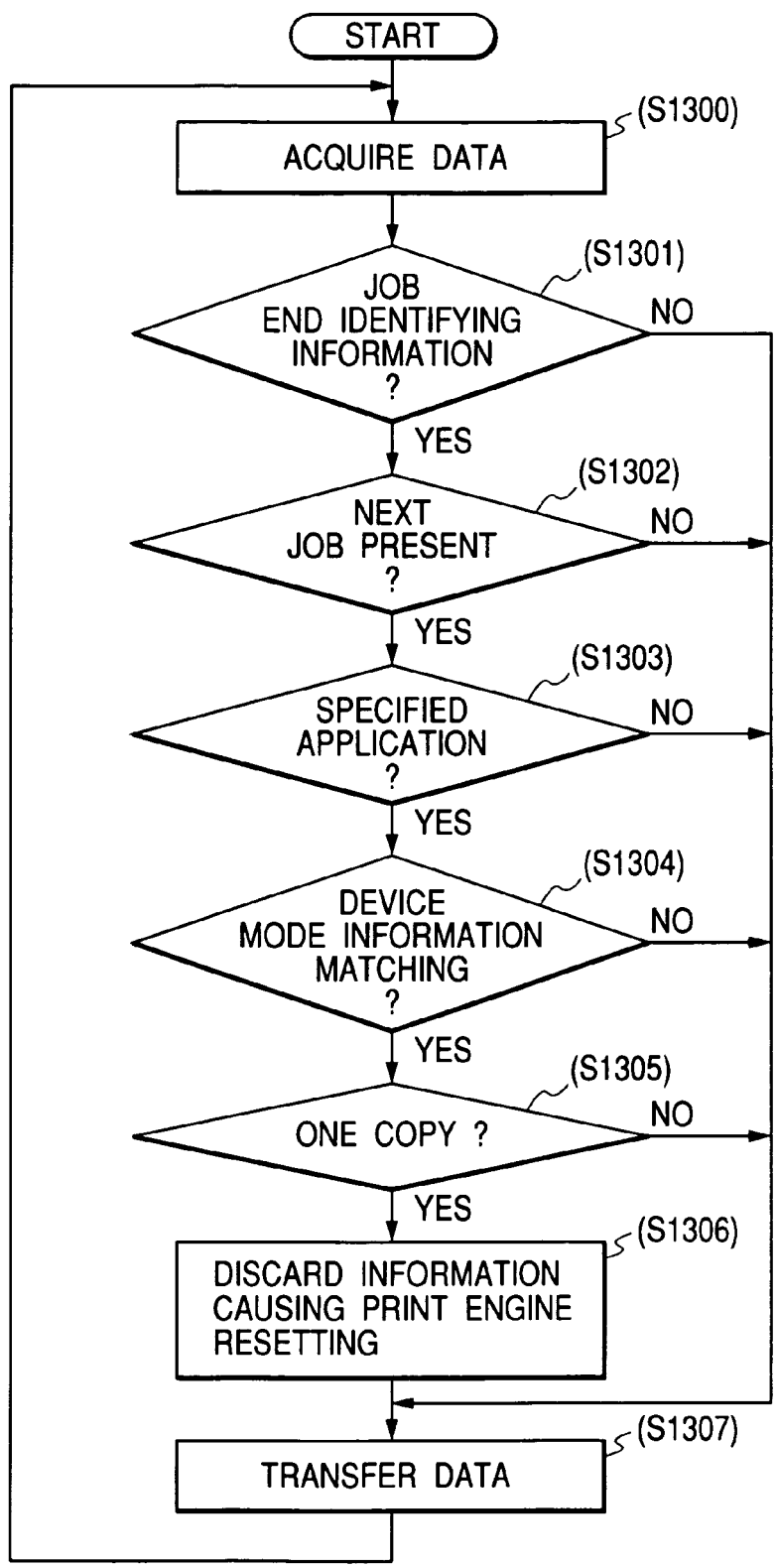
FIG. 11 is a flow chart showing an example of a fifth data processing procedure in the information processing apparatus of the present invention.
Figure 13:
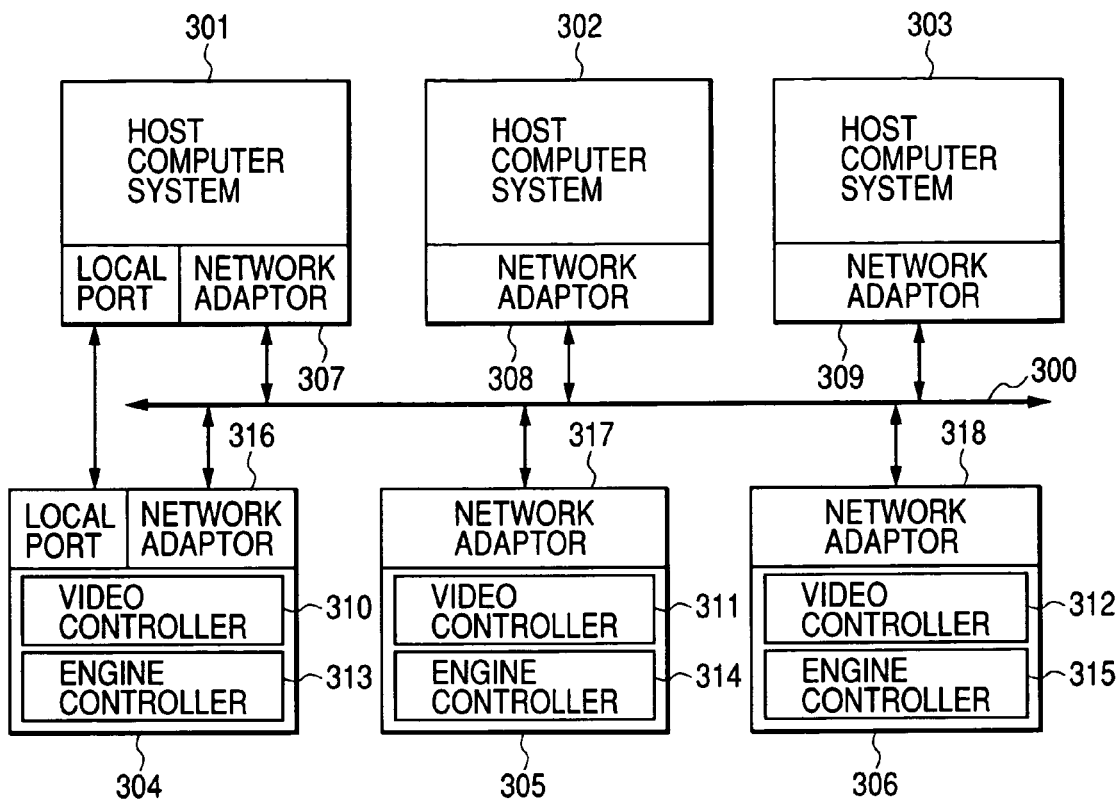
FIG. 13 is a block diagram showing the configuration of a prior network printing system.
Figure 14A:
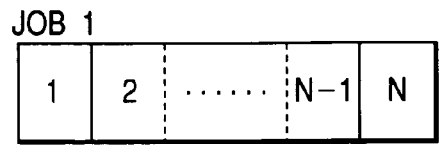
FIGS. 14A and 14B are a conceptual view showing an example of a job transfer process in the prior network printing system shown in FIG. 13.
Figure 14B:

FIG. 11 is a flow chart showing an example of a fifth data processing procedure in the information processing apparatus of the present invention, corresponding to a job processing procedure in the print control unit 523, 533, 543. S1300 to S1307 indicate process steps. In this flow, a process for discriminating a specified application is inserted between the steps S1202 and S1203 shown in FIG. 10, and other processes are same as explained in the foregoing. Therefore, explanation will not be given to such other processes and will be given only on the step S1303.

The step S1303, after a preceding step discriminates whether a succeeding print job is present and in case of presence, identifies an application name used in generating the current print job and the succeeding print job and discriminates whether it coincides with an application name specified in advance as requiring the job combination, and in case of coincidence, the flow next proceeds to a step S1304 for discriminating the coincidence of the device information, but, in case of non-coincidence, the jobs are transmitted to the output apparatus without discarding the information triggering the resetting of the print engine controller (S1307).

A specific process of the application may be obtained for example by specifying an application software by the data generation unit (printer driver) and attaching an application specifying information to the print attribute information group (701-4, 702-4 in FIG. 5) of the print job, whereby the step S1303 may specify the application by the print control unit, based on such application specifying information. It is also possible to attach an application specifying information to the device mode information at the data generation and to execute a discrimination by the step S1303.

Sixth Embodiment

The printer in which the present invention is applicable is not limited to so-called single-function printing apparatus having a printer function only as shown in FIG. 2, but can also be a multi-function equipment, for example having a copy function, a facsimile function, a scanner function etc.

In the following there will be explained a structure of a data processing program readable with the information processing apparatus of the present invention, with reference to a memory map shown in FIG. 12.

FIG. 12 shows a memory map of a memory medium, storing various data processing programs readable with the information processing apparatus of the present invention.

Furthermore, though not shown, there may also be stored information for managing programs stored in the memory medium, such as version information, a preparing person etc., and information dependent on an OS etc. of the program reading side, such as an icon for identifying the program, may also be stored.

In addition, data belonging to various programs are also managed by the directory mentioned above. Also there may be stored a program for installing various programs on a computer, and a thawing program in case the program to be installed is compressed.

Functions of the embodiments shown in FIGS. 7 to 11 may be executed by a host computer, by an externally installed program. The present invention is applicable also in a case where an information group, including programs, is supplied to the output apparatus by a memory medium such as a CD-ROM, a flush memory or a FD, or from an external memory medium through a network.

The objects of the present invention can naturally be attained also in a case where a memory medium, storing program codes of a software realizing the functions of the aforementioned embodiments, is supplied to a system or an apparatus and a computer (or a CPU or an MPU) of such system or apparatus reads and executes the program codes stored in the memory medium.

In such case, the program codes themselves read from the memory medium realize the novel functions of the present invention, and the memory medium storing the program codes constitutes the present invention.

The memory medium for supplying the program codes can be, for example, a flexible disk, a hard disk, an optical disk, a magnetooptical disk, a CD-ROM, a magnetic tape, a non-volatile memory card, a ROM or an EEPROM.

The present invention includes not only a case where a computer executes the read program codes thereby realizing the functions of the aforementioned embodiments but also a case where an OS (operating system) or the like functioning on the computer executes all the actual processes or a part thereof under the instructions of the program codes, thereby realizing the functions of the aforementioned embodiments.

The present invention further includes a case where program codes read from the memory medium are written in a memory provided in a function expansion board inserted into the computer or a function expansion unit connected to the computer, and a CPU or the like provided on such function expansion board or function expansion unit executes all the actual processes or a part thereof under the instructions of such program codes thereby realizing the functions of the aforementioned embodiments.

The present invention is not limited to the aforementioned embodiments but is subject to various modifications (including organic combinations of the embodiments) based on the spirit of the present invention, and such modifications are not excluded from the scope of the present invention.

As many apparently widely different embodiments of the present invention can be made without departing from the spirit and scope thereof, it is to be understood that the invention is not limited to the specific embodiment thereof except as defined in the appended claims.

According to the modes of execution and embodiments explained in the foregoing, it is rendered possible to execute a continuous page printing of continuous print jobs with a maximum printing speed specific to a printing engine in a printing apparatus, without a loss in the printing speed, without requiring any change in the control at the side of the printing apparatus in a host-based printing system, since, even in case plural print jobs are continuously entered from an application software to the printing apparatus, a predetermined reset process is not activated at each partition between the print jobs.

According to the present invention, as explained in the foregoing, in a host-base printing system, by spooling plural print jobs generated in succession, combining plural print jobs entered from a spooling unit and transferring them as a single print job to the printing apparatus, there is obtained an effect of executing a continuous page printing of continuous print jobs with a maximum printing speed specific to a printing engine in a printing apparatus, without a loss in the printing speed, and without requiring any change in the control at the side of the printing apparatus in a host-based printing system, since, even in case plural print jobs are continuously entered from an application software to the printing apparatus, a predetermined reset process is not activated at each partition between the print jobs.

What is claimed is:

1. An information processing apparatus in communication with a printing apparatus which executes a resetting process at a partition between print jobs, the information processing apparatus comprising:
   a first discrimination unit that discriminates whether a current print job and a next print job succeeding to the current print job are generated by a specific application;
   a second discrimination unit that discriminates whether the number of copies for the current print job and the next print job each is one; and
   a discard unit that discards information which causes the resetting process when said first discrimination unit discriminates that the current print job and the next print job are generated by the specific application and when said second discrimination unit discriminates that the number of copies for the current print job and the next print job each is one.

2. An information processing apparatus according to claim 1, further comprising a transfer unit that sequentially transfers print data to the printing apparatus until job end identifying information included in the print job is detected, wherein said discrimination unit executes the discrimination when a print job including print data is obtained from a spooler and job end identifying information included in the obtained print data is detected.

3. A method of an information processing apparatus in communication with a printing apparatus which executes a resetting process at a partition between print jobs, the method comprising:
   performing the following by the information processing apparatus:
   a first discrimination of discriminating whether a current print job and a next print job succeeding to the current print job are generated by a specific application;
   a second discrimination of discriminating whether the number of copies for the current print job and the next print job each is one; and
   discarding information which causes the resetting process when said first discrimination unit discriminates that the current print job and the next print job are generated by the specific application and when said second discrimination unit discriminates that the number of copies for the current print job and the next print job each is one.

4. The method of an information processing apparatus according to claim 3, further comprising sequentially transferring print data to the printing apparatus until job end identifying information included in the print job is detected, wherein said discriminating step is executed when a print job including print data is obtained from a spooler and job end identifying information included in the obtained print data is detected.

5. A computer-readable storage medium storing a computer-executable program for an information processing apparatus in communication with a printing apparatus which executes a resetting process at a partition between print jobs, the computer-executable program comprising:
   a first discrimination of discriminating whether a current print job and a next print job succeeding to the current print job are generated by a specific application;
   a second discrimination of discriminating whether the number of copies for the current print job and the next print job each is one; and
   discarding information which causes the resetting process when said first discrimination discriminates that the current print job and the next print job are generated by the specific application and when said second discrimination discriminates that the number of copies for the current print job and the next print job each is one.

6. A computer-readable storage medium storing a computer-executable program for an information processing apparatus according to claim 5, further comprising sequentially transferring print data to the printing apparatus until job end identifying information included in the print job is detected, wherein said discrimination is executed when a print job including print data is obtained from a spooler and job end identifying information included in the obtained print data is detected.

* * * * *